United States Patent Office …

3,562,279
Patented Feb. 9, 1971

3,562,279
SUBSTITUTED 7,8-DIHYDRO - 6- METHOXY-6,14-ENDO(ETHENO OR ETHANO)MORPHIDE - 7-KETONES AND N-CYCLOALKYLMETHYL - 7,8-DIHYDRO - 6 - METHOXY-6,14-ENDO(ETHENO OR ETHANO)NORCODIDE-7-KETONES
John Johnston Brown, Pearl River, N.Y., Robert Allis Hardy, Jr., Ridgewood, N.J., and Carol Nora Roth, nee Carol Therese Nora, Houston, Tex., assignors to American Cyanamid Company, Stamford, Conn., a corporation of Maine
No Drawing. Continuation-in-part of application Ser. No. 671,123, Sept. 27, 1967, which is a continuation-in-part of application Ser. No. 634,116, Apr. 27, 1967. This application May 15, 1969, Ser. No. 825,029
Int. Cl. C07d 43/28; A61k 27/00
U.S. Cl. 260—285   10 Claims

ABSTRACT OF THE DISCLOSURE

This disclosure describes compounds of the class of substituted 7,8 - dihydro-6-methoxy-6,14-endo(etheno or ethano)morphide-7-ketones and N-cycloalkylmethyl-7,8-dihydro-6-methoxy - 6,14 - endo(etheno or ethano)norcodide-7-ketones which possess analgesic activity.

CROSS REFERENCE TO RELATED APPLICATION

This application is a continuation-in-part of our co-pending application Ser. No. 671,123, filed Sept. 27, 1967, which is a continuation-in-part of our application Ser. No. 634,116, filed Apr. 27, 1967, both now abandoned.

BRIEF SUMMARY OF THE INVENTION

This invention relates to novel substituted 7,8-dihydro-6-methoxy - 6,14 - endo(etheno or ethano)morphide-7-ketones and N-cycloalkylmethyl-7,8-dihydro-6-methoxy-6,14-endo(etheno or ethano)norcodide-7-ketones and to methods of preparing these compounds. The novel compounds of the present invention may be represented by the following general formulae:

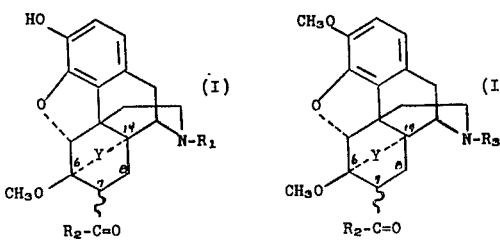

wherein $R_1$ is hydrogen, methyl, lower alkenyl or lower cycloalkylmethyl; $R_2$ is hydrogen, phenyl or alkyl of from 1 to 5 carbon atoms; $R_3$ is lower cycloalkylmethyl; and Y is etheno or ethano. Typical alkyl groups of from 1 to 5 carbon atoms are, for example, methyl, ethyl, n-propyl, isopropyl, n-butyl, isoamyl, etc. Suitable lower alkenyl groups are those having up to about 6 carbon atoms such as, for example, allyl, methallyl, dimethallyl, and the like. Suitable lower cycloalkylmethyl groups are those having from 4 to 7 carbon atoms such as cyclopropylmethyl, cyclobutylmethyl, cyclopentylmethyl, etc.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are however, generally insoluble in water.

The organic bases of this invention form non-toxic acid-addition salts with a variety of organic and inorganic salt-forming agents. Thus, acid-addition salts, formed by admixture of the organic free base with the equivalent amount of an acid, suitable in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases of the above general Formula I. For purposes of this invention the organic free bases are equivalent to their non-taxic acid-addition salts and their alkali metal salts.

The novel compounds of the present invention may be readily prepared from an appropriately substituted 7-formyl-, 7-alkanoyl- or 7-benzoyl-7,8-dihydro-6-methoxy-6,14-endo(etheno or ethano)codide-19-ketal derivative.

The following reaction scheme illustrates one method for the preparation of the compounds of the present invention:

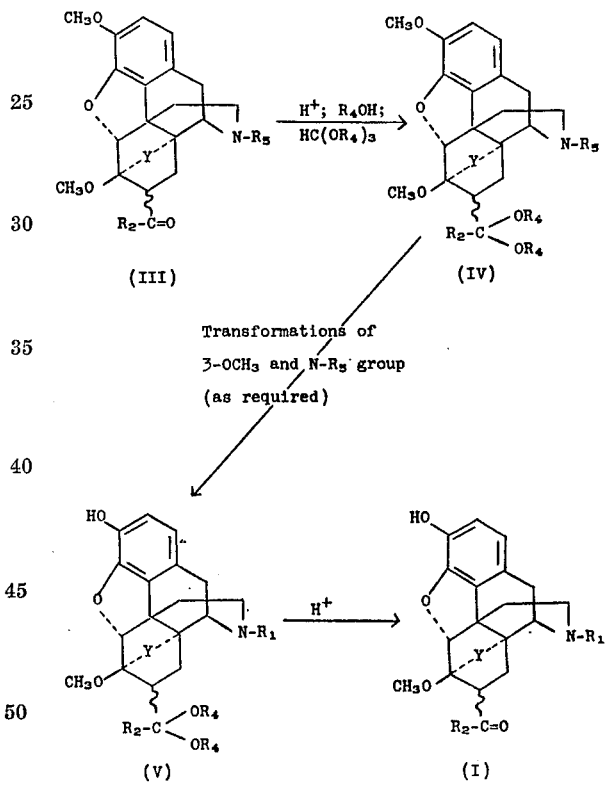

wherein $R_1$, $R_2$ and Y are as previously described; and $R_4$ is lower alkyl and $R_5$ is hydrogen, cyano, methyl, lower cycloalkylcarbonyl or lower alkenyl. By this procedure, a 7-formyl-, 7-alkanoyl- or 7-benzoyl-7,8-dihydro-6-methoxy-6,14-endo(etheno or ethano)codide (III) is treated with a suitable acid such as perchloric acid and a lower alkanol ($R_4OH$), generally in the presence of its corresponding tri(lower alkyl)orthoformate ester $$[HC(OR_4)_3]$$

(e.g., methanol and trimethyl orthoformate, ethanol and triethyl orthoformate, etc.). This reaction is conveniently carried out in an excess of the alkanol as the solvent, although in other cases an inert solvent such as benzene is used. The preferred temperature range is from about 15° C. to about 100° C., over a period of time of from about several minutes to 24 hours or more. A preferred procedure is the reaction with the lower alkanol-tri(lower alkyl)orthoformate mixture (esp. methanol-trimethyl orthoformate) at room temperature for about 5-10 minutes, at which time the transformation is substantially complete. Suitable acids include, for example, perchloric acid, p-toluenesulfonic acid, sulfuric acid, hydrochloric acid, and the like. The 7-alkanoyl (and 7-formyl and 7-benzoyl) derivatives (III) required as intermediates are readily obtained as described by K. W. Bentley, et al., J. Org. Chem. 23, 1925 (1958), and J. Am. Chem. Soc. 89, 3267, 3273 (1967).

Inherent in the above described general preparative scheme for the novel compounds of the present invention are transformation of the 3-methoxy group and transformations of the N-substituent ($R_5$). For example, the 3-methoxy derivatives (IV; codide series) may be transformed to 3-hydroxy derivatives (V; morphide series) by heating with an alkali metal hydroxide in diethylene glycol. A particular advantage of this transformation is the fact that the C-19 ketal group (in IV; the C-19 carbon being bonded to the C-7 carbon) is unaffected during this reaction with alkali at an elevated temperature; these transformations are, therefore, included within the purview of the present invention. Similar treatment of C-7 ketones (such as III) with alkaline reagents has produced molecular rearrangement in which the 7-ketone group is altered. For example, when 7α-acetyl-6,7,8,14-tetrahydro-6,14-endoethenothebaine is treated with base there is obtained, upon neutralization, 18-acetyl-5,14-ethanothebainone as follows:

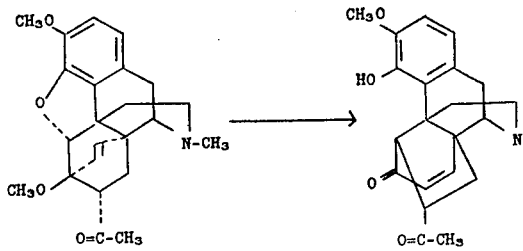

Thus, the alkaline transformation of a 3-methoxy group to a 3-hydroxyl group in the presence of a C-19 ketal, and the products produced therefrom, represent particularly desirable features of the present invention. This reaction is generally carried out at a temperature range from about 150° C. to about 240° C., and the range of from about 200° C. to about 220° C. is preferred. Heating is continued until the reaction is substantially complete, generally from about several minutes to several hours or more. Suitable metal hydroxides include potassium hydroxide, sodium hydroxide, and the like.

Transformations of the N-substituent ($R_5$) are also useful methods for the compounds of this invention; and for certain examples are the preferred method of synthesis. These transformations are, therefore, included within the purview of the present invention. The N-methyl derivatives (codides IV; $R_5=CH_3$) may be treated with cyanogen halides using procedures well known to those skilled in the art. N-cyano derivatives (IV; $R_5=CN$) are thereby obtained. Hydrolysis of the N-cyano derivatives by heating with a metal hydroxide in diethylene glycol may then be employed to produce norcodides ($R_5=H$). This procedure is particularly advantageous in that the C-19 ketal group (in IV) is unaffected by treatment with alkali at an elevated temperature. Similar treatment of C-7 ketones (such as III) with alkaline reagents has produced molecular rearrangements (supra) in which the C-7 ketone is a reactive moiety. Thus, the alkaline hydrolysis of an N-cyano group to an NH group in the presence of a C-19 ketal, and the novel products of this invention produced therefrom represent particularly desirable features of the present invention. This reaction is generally carried out at a temperature of from about 130° C. to about 240° C., and the range of from about 150° C. to about 180° C. is preferred. In the preferred temperature range, hydrolysis of the N-cyano group proceeds readily without extensive transformation of a 3-methoxy group (if present). At higher temperatures, that is in the range of from about 200° C. to about 220° C., concomitant hydrolysis of both N-cyano and 3-methoxy groups takes place. This procedure which simultaneously transforms an N-cyano group and a 3-methoxy group is, therefore, the preferred method of synthesis for certain examples of this invention. Heating is continued until the reaction is substantially complete, generally from about several minutes to several hours or more. Suitable metal hydroxides includes potassium hydroxide, sodium hydroxide, and the like. These norcodides and normorphides containing the secondary amine moiety may then be re-alkylated with a suitable methyl alkenyl or cycloalkylmethyl halide or equivalent using procedures well known to those skilled in the art. Suitable alkylating agents include methyl idodide, cyclopropylmethyl bromide, allyl bromide, methallyl bromide, dimethallyl bromide and the like.

The appropriately substituted 7-ketal derivative (V), in which the 3-methoxy and N—$R_5$ groups have been transformed (as in IV→V), is then hydrolzed under acidic conditions, and the novel compounds of the present invention are thereby obtained. Dilute aqueous acids including hydrochloric, sulfuric, phosphoric, trifluoroacetic, and the like are generally used, and the transformation is substantially complete within a few minutes at room temperature. The temperature range is from about 0° C. to about 100° C.

Another useful procedure for preparing the novel compounds of this invention is illustrated by the following reaction scheme:

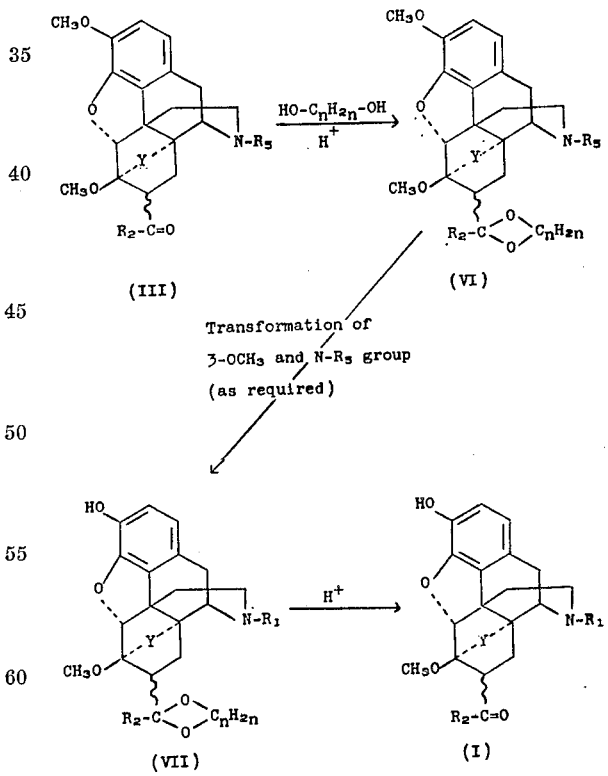

wherein $R_1$, $R_2$, $R_5$ and Y are as previously described; and n is 2 or 3. By this procedure, the 7-acyl derivative (III) is reacted with an alkylene glycol (HO—$C_nH_{2n}$—OH)

in the presence of an acid catalyst. Suitable glycols include ethylene glycol, propylene glycol, and the like. Suitable acid catalysts include p-toluenesulfonic acid, perchloric acid, sulfuric acid, and the like. This reaction is conveniently carried out in an inert solvent such as benzene, and the temperature range is from about 20° C. to about 140° C. for 20–24 hours or longer. Inherent in this preparative scheme are transformation of the 3-methoxy group and transformations of the N-substituent ($R_5$) in the conversions of (VI) to (VII) in a manner similar to the previously described transformations of (IV) to (V). The substituted 7-alkyleneketal derivatives (VII) are then hydrolyzed under acid conditions (VII→I) to produce the novel compounds of the present invention in a manner similar to the previously described transformation of (V) to (I).

Another embodiment of the present invention is shown by the following reaction scheme which illustrates the preparation of the novel N-cycloalkylmethyl-7,8-dihydro-6-methoxy - 6,14 - endo-(etheno or ethano)norcodide-7-ketones (II):

ketone. The reduced derivatives (X) are then hydrolyzed under acidic conditions as previously described, and the novel N-cycloalkylmethyl - 7,8-dihydro-6-methoxy-6,14-endo(etheno or ethano)norcodide - 7-ketones (II) are, thereby, obtained. In a similar manner, a nor-derivative containing a C–19 alkylene ketal may be acylated with a cycloalkanecarbonyl halide followed by reduction with lithium aluminum hydride and hydrolysis (to II).

A particular advantage of the novel compounds of this invention is evident by virtue of the fact that these compounds have been inaccessible by previously known methods. A convenient procedure for hydrolysis of a 3-methoxy group (codide series) to a 3-hydroxy group (morphide series), applicable for many codide derivatives, consists of heating with a metal hydroxide. This method cannot be used for derivatives which contain a 7-ketone

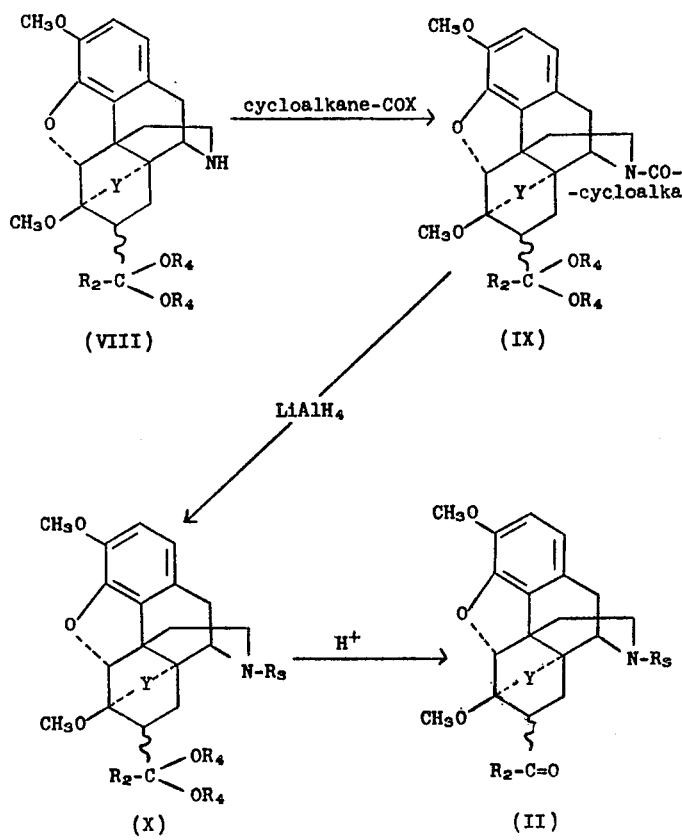

wherein $R_2$, $R_3$, $R_4$ and Y are as previously described; the cycloalkane group is cyclopropyl, cyclobutyl and the like; and X is a reactive halogen or equivalent acylating function. By this procedure a nor-compound (VIII), prepared as previously described (e.g. IV, $R_5$=H), is acylated by reaction with a cycloalkane carbonyl halide. Suitable reactants are cyclopropanecarbonyl chloride, cyclobutanecarbonyl bromide, and the like. The N-cycloalkanecarbonyl derivatives (IX), produced by this step, are then reduced with lithium aluminum hydride (or an equivalent reducing agent), generally in an inert solvent such as tetrahydrofuran or ether, and the N-cycloalkylmethyl-7,8-dihydro - 6 - methoxy-6,14-endo(etheno or ethano) norcodide-19-ketal derivatives (X) are, thereby, obtained. An especially desirable feature of the present invention is the fact that lithium aluminum hydride reduction of the cycloalkylcarboxamides (IX) proceeds readily, while the C–19 ketal groups are unaffected. Similar reduction of N-cycloalkylcarbonyl groups in compounds containing a C–7 ketone group (i.e., III; $R_5$=cyclopropylcarbonyl, etc.) is not possible without concomitant reduction of the group, however, as rearrangement products predominate under these conditions as set forth above. Thus, the compounds of this invention represent a valuable new series of 7-ketone derivatives.

Additionally, for certain 3-hydroxy-7-ketones (I;

$R_1$=alkenyl etc.), alkylation of a nor-derivative (I: $R_1$=H) may be a preferred procedure. For example, a normorphide-7-ketone may be acylated with a suitable methyl, alkenyl, or cycloalkylmethyl halide or equivalent using procedures well known to those skilled in the art. Suitable alkylating agents include methyl iodide, cyclobutylmethyl bromide, allyl bromide, methallyl bromide, dimethallyl bromide and the like.

The novel products of the present invention are useful and valuable as analgesic agents which may show a variety of types of analgesic activity within the general scope of analgesic or anti-nociperceptive actions. These include morphine-like modes of action; non-narcotic analgesic modes of action; and analgesic antagonist modes of action. The overall analgesic activity of a given command within the scope of the present invention may be readily determined by applying one or more of the routine tests described hereinbelow. The specific type of analgesic activity of a given compound may then be judged by those skilled in the art from the combined results of these several test procedures.

The novel compounds of the present invention are active analgesics when measured by the "writhing syndrome" test for analgesic activity as described by Siegmund et al., Proc. Soc. Exptl. Biol. Med. vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after inpection of the phenyl-p-quinone. A compound is considered active if it reduces the total number of writhes in two test mices from a control value of approximately 30 per pair to a value of 18 or less. In a representative operation, and merely by way of illustration, 7α - acetyl-6,7,8,14-tetradro - 6,14 - endoenthenooripavine and 7α-acetyl-N-cyclopropylmethyl - 6,7,8,14 - tetrahydro - 6,14 - endoethenonororipivane both showed analgesic activity when tested by this procedure at an oral dose of 25 mg./kg. of body weight. If desired, the median effective dose ($ED_{50}$) for any particular compound may be calculated from the results obtained by repeating this test in multiple groups of two mice each at each of several graded dose levels.

A supplementary procedure which generally indicates a morphine-like mode of action is the rat-tail flick method described by F. E. D'Amour and D. L. Smith, J. Pharmacol. Exptl. Therap., vol. 72, p. 74 (1941), with modifications. The compounds (generally as hydrochloride salts in 0.9% saline) are administered subcutaneously to groups of 5 rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100% increase in response time over controls. Established clinically active anlagesics such as meperidine, codeine, morphine, etc., are active in the above test. When tested by this procedure, certain compounds of the present invention show this type of analgesic action. For example, 7α-acetyl-6,7,8,14-tetrahydro-6,14-endoethenooripavine shows morphine-like analgesic activity when so tested at a dose of .1 mg./kg. of body weight subcutaneously.

Additionally, supplementary routine tests known to those skilled in the art may be carried out to assess the importance of side effects frequently associated with the morphine-like analgesics. These include such actions as onset and duration of action, development of tolerance, respiratory depression, addiction liability, relative effects by oral and parenteral administration, and inhibitory effects on the gastrointestinal system.

Other compounds of this invention may show analgesic antagonist activity when tested against a selected dose of morphine or other morphine-like agents. This antagonist activity may be considered useful as a specific antidote for an overdose of a morphine-like agent, or for its non-narcotic analgesic action. Experience has shown that such narcotic antagonists are also capable of relieving pain despite the fact that they are generally inactive in the rat tail-flick procedure (see above), and have little or no addiction hazard; see L. S. Harris and A. K. Pierson, J. Pharmacol. Exptl. Therap., vol. 143, p. 141 (1964). Analgesics which produce satisfactory pain-relief without serious side effects, particularly with regard to the tolerance, habituation and drug dependence of the opiates, have been sought for many years. When tested against morphine by a procedure similar to that described by Harris and Pierson (supra), 7α-acetyl-N-cyclopropylmethyl-6,7,-8,14-tetrahydro-6,14-endoethenonorthebaine and 7α-acetyl-N-cyclopropylmethyl-6,7,8,14-tetrahydro - 6,14 - endoethenonororipavine both showed analgesic antagonist activity at a dose of about 2 mg./kg. and 0.03 mg./kg., respectively, of body weight subcutaneously.

In addition, supplementary test procedures such as measuring the elevation of the pain threshold of rat paws inflamed with brewers yeast may be carried out to confirm the analgesic action of the novel compounds of the present invention. In certain cases, these compounds also show anti-inflammatory activity.

The novel compounds of the present invention are also valuable intermediates for the preparation of a class of active analgesics in accordance with the following reaction scheme:

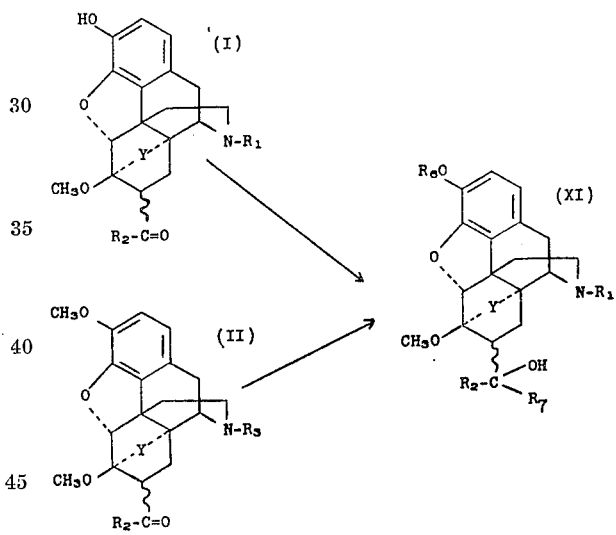

wherein $R_1$, $R_2$, $R_3$ and Y are as hereinabove defined, $R_6$ is hydrogen or methyl and $R_7$ is alkyl of from 1 to 5 carbon atoms, phenyl, cyclohexyl, benzyl or phenethyl. The novel compounds of the present invention, (I) and (II), may be readily transformed to the corresponding 7-carbinols (XI), a class of active analgesics, in accordance with the methods described in K. W. Bentley et al., Proc. Chem. Soc., 220 (1963) and J. Am. Chem. Soc., 89, 3273, 3281 (1967).

When mixed with suitable excipients or diluents, the compounds of this invention can be prepared as pills, capsules, tablets, powders, solution, suspensions and the like for unit dosage, and to simplify administration. As analgesics they will relieve pain by direct action on the nerve centers or by diminishing the conductivity of the sensory nerve fibers. The novel compounds of the present invention may also be administered in combination therapy with salicylates such as aspirin and the like.

The novel compounds of this invention may exist in several isomeric forms such as stereoisomers. It is to be understood that the present invention includes within its scope all such isomeric forms. For example, the codides used as starting materials have several asymmetric carbon atoms, and epimers at the C-7 asymmetric center are possible and are known. Formation of stereoisomers, or epimers, at C-7 is therefore possible in the products of this invention. The nuclear magnetic resonance spectra of these 7α- and 7β-ketone derivatives of the 7,8-dihydro-6-methoxy-6,14-endo(etheno or ethano)codides and morphides are particularly helpful in characterizing the mixtures of epimers or the substantially pure stereoisomers as obtained from the reaction mixtures or from subsequent purifications and separations. These isomers may then be separated by methods (such as fractional crystallization and partition-chromatography) well known to those skilled in the art. All such stereoisomeric forms of the 7-ketone derivatives of the 7,8-dihydro-6-methoxy-6,14-endo(etheno or ethano)codides and morphides are, therefore, included within the purview of this invention.

In accordance with accepted convention, an α-substituent at the 7-position is behind the plane of the paper whereas a β-substituent at the 7-position is in front of the plane of the paper. This is usually represented by a ---- bond for an α-substituent, a — bond for a β-substituent, and a

bond where both are indicated.

The invention will be desecribed in greater detail in conjunction with the following specific examples.

EXAMPLE 1

Preparation of 7α-acetyl-6,7,8,14-tetrahydro-6,14-endoethenooripavine

7α-(1,1 - dimethoxyethyl - 6,7,8,14 - tetrahydro - 6,14 - endoethenooripavine (1.5 g.) is dissolved in dilute aqueous hydrochloric acid (5%, 25 ml.). After a few minutes the acidic solution is made basic with sodium bicarbonate and then extracted with methylene chloride. The methylene chloride extract is washed with water and dried. The residue obtained by evaporation of solvent is crystallized from methanol to give 7α-acetyl-6,7,8,14-tetrahydro-6,14-endoethenooripavine (887 mg.), M.P. 215–217° C.

EXAMPLE 2

Preparation of 7α-acetyl-6,7,8,14-tetrahydro-6,14-endoethenooripavine

Following the general procedure of Example 1, 17α-(1,1-ethylenedioxyethyl) - 6,7,8,14 - tetrahydro - 6,14-endoethenooripavine is treated with dilute sulfuric acid. Neutralization with base then gives 7α-acetyl-6,7,8,14-tetrahydro-6,14-endoethenooripavine.

EXAMPLE 3

Preparation of 7α-acetyl-N-cyclopropylmethyl-6,7,8,14-tetrahydro-6,14-endoethenonorthebaine hydrochloride Following the general procedure of Example 1, 7α-(1,1 - dimethoxyethyl) - N-cyclopropylmethyl - 6,7,8,14-tetrahydro-6,14-endoethenonorthebaine is dissolved in dilute hydrochloric acid. Extraction of the acidic solution with methylene chloride, followed by isolation of the product, gives 7α - acetyl - N-cyclopropylmethyl - 6,7,8, 14 - tetrahydro - 6,14-endoethenonorthebaine hydrochloride, M.P. 249–250° C. with dec. when crystallized from acetone.

EXAMPLE 4

Preparation of 7α-acetyl-N-cyclopropylmethyl-6,7,8,14-tetrahydro-6,14-endoethenonororipavine Following the general procedure of Example 1, N-cyclopropylmethyl - 7α-(1,1 - dimethoxyethyl) - 6,7,8, 14 - tetrahydro - 6,14-endoethenonororipavine is treated with dilute hydrochloric acid. Neutralization with base then gives 7α - acetyl - N-cyclopropylmethyl - 6,7,8,14-tetrahydro-6,14-endoethenonororipavine, M.P. 208–210° C. when crystallized from methanol.

EXAMPLE 5

Preparation of 7α-acetyl-6,7,8,14-tetrahydro-6,14-endoethenonororipavine

Following the general procedure of Example 1, 7α-(1,1 - dimethoxyethyl) - 6,7,8,14-tetrahydro - 6,14 - endoethenonororipavine is treated with dilute hydrochloric acid. Neutralization with base then gives 7α-acetyl-6,7,8,14-tetrahydro-6,14-endoethenonororipavine.

EXAMPLE 6

Preparation of 7α-acetyl-N-allyl-6,7,8,14-tetrahydro-6-14-endoethenonororipavine By reacting 7α-acetyl - 6,7,8,14 - tetrahydro - 6,14-endoethenonororipavine with allyl chloride in an inert solvent, 7α - acetyl - N-allyl - 6,7,8,14 - tetrahydro - 6,14-endoethenonororipavine is thereby obtained.

EXAMPLE 7

Preparation of 7α-acetyl-N-(3-methyl-2-buten-1-yl)-6,7,8,14-tetrahydro-6,14-endoethenonororipavine By reacting 7α-acetyl - 6,7,8,14 - tetrahydro - 6,14-endoethenonororipavine with 3-methyl-2-buten-1-yl bromide in an inert solvent, 7α-acetyl - N-(3-methyl - 2-buten - 1-ly)-6,7,8,14-tetrahydro-6,14 - endoethenonororipavine is thereby obtained.

EXAMPLE 8

Preparation of 7α-formyl-6,7,8,14-tetrahydro-6,14-endoethenooripavine

Following the general procedure of Example 1, 7α-(1, 1 - dimethoxymethyl) - 6,7,8,14 - tetrahydro - 6-14-endoethenooripavine is treated with dilute hydrochloric acid. Neutralization with base then gives 7α-formyl-6,7, 8,14-tetrahydro-6,14-endoethenooripavine.

EXAMPLE 9

Preparation of 7α-benzoyl-6,7,8,14-tetrahydro-6,14-endoethenooripavine

Following the general procedure of Example 1, 7α-α,α - dimethoxybenzyl) - 6,7,8,14-tetrahydro - 6,14 - endoethenooripavine is treated with dilute hydrochloric acid. Neutralization with base then gives 7α-benzoyl-6,7, 8,14-tetrahydro-6,14-endoethenooripavine.

EXAMPLE 10

Preparation of 7α-butyryl-6,7,8,14-tetrahydro-6,14-endoethenooripavine

Following the general procedure of Example 1, 7α-(1,1 - dimethoxybutyl) - 6,7.8.14 - tetrahydro - 6,14-endoethenooripavine is treated with dilute hydrochloric acid. Neutralization with base gives 7α-butyryl-6,7,8,14-tetrahydro-6,14-endoethenooripavine.

EXAMPLE 11

Preparation of N-cyclopropylmethyl-7α-butyryl-6,7,8,14-tetrahydro-6,14-endoethenonorthebaine Following the general procedure of Example 1, N-cyclopropylmethyl - 7α - (1,1-dimethoxybutyl) - 6,7,8,14-tetrahydro-6,14 - endoethenonorthebaine is treated with dilute hydrochloric acid. Neutralization with base then gives N-cyclopropylmethyl - 7α - butryl - 6,7,8,14-tetrahydro-6,14-endoethenonorthebaine.

EXAMPLE 12

Preparation of 7α-(4-methylpentanoyl)-6,7,8,14-tetrahydro-6,14-endoethenooripavine Following the general procedure of Example 1, 7α-(1,1-dimethoxy-4-methylpentyl)-6,7,8,14 - tetrahydro-6,14-endoethenooripavine is treated with dilute hydrochloric acid. Neutralization with base gives 7α-(4-methylpentanoyl)-6,7,8,14-tetrahydro-6,14-endoethenooripavine.

EXAMPLE 13

Preparation of 7α-acetyl-N-cyclobutylmethyl - 6,7,8,14-tetrahydro-6,14-endoethenonorthebaine hydrochloride Following the general procedure of Example 1, 7α-(1,1-dimethoxyethyl)-N-cyclobutylmethyl - 6,7,8,14 - tetrahydro-6,14-endoethenonorthebaine is dissolved in dilute hydrochloric acid. Neutralization and extraction with methylene chloride, followed by isolation of the product, gives 7α-acetyl-N-cyclobutylmethyl - 6,7,8,14 - tetrahydro-6,14-endoethenonorthebaine.

EXAMPLE 14

Preparation of 7α-acetyl-N-cyclobutylmethyl-6,7,8,14-tetrahydro-6,14-endoethenonororipavine Following the general procedure of Example 1, N-cyclobutylmethyl - 7α - (1,1-dimethoxyethyl)-6,7,8,14-tetrahydro-6,14-endoethenonororipavine is treated with dilute hydrochloric acid. Neutralization with base then gives 7α-acetyl-N-cyclobutylmethyl - 6,7,8,14 - tetrahydro-6,14-endoethenonororipavine.

EXAMPLE 15

Preparation of 7α-acetyl-6,7,8,14-tetrahydro-6,14-endoethanooripavine

Following the general procedure of Example 1, 7α-(1,1-dimethoxyethyl)-6,7,8,14-tetrahydro - 6,14 - endoethanooripavine is treated with dilute hydrochloric acid. Neutralization with base then gives 7α-acetyl-6,7,8,14-tetrahydro-6,14-endoethanooripavine.

EXAMPLE 16

Preparation of 7α-acetyl-N-cyclopropylmethyl-6,7,8,14-tetrahydro-6,14-endoethanonorthebaine Following the general procedure of Example 1, 7α-(1,1-dimethoxyethyl)-N-cyclopropylmethyl - 6,7,8,14-tetrahydro-6,14-endoethanonorthebaine is dissolved in dilute hydrochloric acid. Neutralization followed by isolation of the product gives 7α-acetyl-N-cyclopropylmethyl-6,7,8,14-tetrahydro-6,14-endoethanonorthebaine.

EXAMPLE 17

Preparation of 7α-acetyl-N-cyclopropylmethyl-6,7,8,14-tetrahydro-6,14-endoethanonororipavine Following the general procedure of Example 1, N-cyclopropylmethyl-7α-(1,1-dimethoxyethyl)-6,7,8,14 - tetrahydro-6,14-endoethanonororipavine is treated with dilute hydrochloric acid. Neutralization with base then gives 7α-acetyl-N-cyclopropylmethyl - 6,7,8,14-tetrahydro-6,14-endoethanonororipavine.

EXAMPLE 18

Preparation of 7α-acetyl-N-(3-methyl-2-buten-1-yl) 6,7,8,14-tetrahydro-6,14-endoethanonororipavine Following the general procedure of Example 1, N-(3-methyl-2-buten-1-yl) - 7α - (1,1-dimethoxyethyl)-6,7,8,14-tetrahydro-6,14-endoethanonororipavine is treated with dilute hydrochloric acid. Neutralization with base then gives 7α-acetyl-N - (3-methyl-2-buten-1-yl)-6,7,8,14-tetraaydro-6,14-endoethanonororipavine.

EXAMPLE 19

Preparation of 7β-acetyl-6,7,8,14-tetrahydro-6,14-endoethenooripavine

Following the general procedure of Example 1, 7β-(1,1-dimethoxyethyl)-6,7,8,14 - tetrahydro-6,14-endoethenooripavine is treated with dilute hydrochloric acid. Neutralization with base then gives 7β-acetyl-6,7,8,14-tetrahydro-6,14-endoethenooripavine.

EXAMPLE 20

Preparation of 7β-acetyl-N-cyclopropylmethyl-6,7,8,14-tetrahydro-6,14-endoethenonorthebaine Following the general procedure of Example 1, 7β-(1,1-dimethoxyethyl)-N-cyclopropylmethyl - 6,7,8,14-tetrahydro-6,14-endoethenonorthebaine is dissolved in dilute hydrochloric acid. Neutralization followed by isolation of the product gives 7β-acetyl-N-cyclopropylmethyl-6,7,8,14-tetrahydro-6,14-endoethenonorthebaine.

EXAMPLE 21

Preparation of 7β-acetyl-N-cyclopropylmethyl-6,7,8,14-tetrahydro-6,14-endoethenonororipavine Following the general procedure of Example 1, 7β-(1,1-dimethoxyethyl)-N-cyclopropylmethyl - 6,7,8,14-tetrahydro-6,14-endoethenonororipavine is dissolved in dilute hydrochloric acid. Neutralization followed by isolation of the product gives 7β-acetyl-N-cyclopropylmethyl-6,7,8,14-tetrahydro-6,14-endoethenonororipavine.

EXAMPLE 22

Preparation of 7α-(1,1-dimethoxyethyl)-6,7,8,14-tetrahydro-6,14-endoethenothebaine Perchloric acid (20 ml.; 72%) is added dropwise to a stirred solution of 7α-acetyl-6,7,8,14-tetrahydro-6,14-endothenothebaine (40 g.) in methanol (400 ml.). Trimethyl orthoformate (200 ml.) is then added, and the mixture is stirred for 5 minutes. Pyridine (40 ml.) is then added, and the mixture is poured into aqueous sodium bicarbonate. The material which separates is collected and dissolved in methylene chloride solution, and this fraction is dried. Evaporation of solvent followed by crystallization from ethanol gives 7α(1,1-dimethoxyethyl)-6,7,8,14-tetrahydro-6,14 - endoethenothebaine (36.57 g.), M.P. 121–123° C. with effervescence. Second and third crops yield 2.1 g., M.P. 117–118° C. with effervescence and 0.6 g., M.P. 115–117° C. with effervescence.

EXAMPLE 23

Preparation of 7α-(1,1-ethylendioxyethyl)-6,7,8,14-tetrahydro-6,14-endoethenothebaine A mixture of 7α-acetyl-6,7,8,14-tetrahydro-6,14-endoethenothebaine (1 g.), ethylene glycol (6 ml.), benzene (75 ml.), and p-toluenesulfonic acid dihydrate (550 mg.) is stirred and heated under reflux for eighteen hours; water formed during the reaction being removed with a Dean-Stark moisture trap. An excess of aqueous sodium bicarbonate is added to the cooled mixture and the layers are separated. The aqueous phase is extracted with methylene chloride and the combined organic extracts are dried. The gum obtained by evaporation of solvent is dissolved in methylene chloride, and the solution is passed through a short column of Magnesol®. The eluate is evaporated and the residue is crystallized from n-hexane to give 7α(1,1-ethylene-dioxyethyl)-6,7,8,14-tetrahydro-6,14-endoethenothebaine (680 mg.), M.P. 122–125° C.

EXAMPLE 24

Preparation of 7α-(1,1-dimethoxyethyl)-6,7,8,14-tetrahydro-6,14-endoethenooripavine 7α - (1,1-dimethoxyethyl)-6,7,8,14-tetrahydro-6,14-endoethenothebaine (5 g.) is added to a solution of potassium hydroxide (20 g.) in diethylene glycol (100 ml.) heated to ca. 210° C. The reaction mixture is stirred at ca. 210° C. for 25 minutes, and is then cooled and diluted with water. The aqueous solution is washed with ether, adjusted to pH 8 with ammonium chloride, and then extracted with methylene chloride. The methylene chloride extracts are combined, washed with water and dried. The oil obtained by evaporation of the solvent is crystallized from methanol (charcoal) to give 7α-(1,1-dimethoxyethyl) - 6,7,8,14-tetrahydro-6,14-endoethenooripavine (2.47 g.), M.P. 116–117° C. with effervescence. This

EXAMPLE 25

Preparation of N-cyano-7α-(1,1-dimethoxyethyl)-6,7,8, 14-tetrahydro-6,14-endoethenonorthebaine A solution of cyanogen bromide (17.9 g.) in chloroform (175 ml.) is dried over sodium sulfate for a few minutes and is then filtered onto 7α-(1,1-dimethoxyethyl)-6,7,8, 14-tetrahydro-6,14-endoethenothebaine (35 g.), chloroform (175 ml.) being used for washing. The mixture is heated under reflux for 26 hours. The cooled mixture is washed with an aqueous sodium bicarbonate solution, washed with water, and dried. The residue obtained by evaporation of the solvent is crystallized from methylene chloride - methanol to give N-cyano-7α-(1,1-dimethoxyethyl) - 6,7,8,14 - tetrahydro-6,14-endoethenonorthebaine (20 g.), M.P. 211–214° C. with effervescence.

EXAMPLE 26

Preparation of 7α-(1,1-dimethoxyethyl)-6,7,8,14-tetrahydro-6,14-endoethenonorthebaine N - cyano - 7α-(1,1-dimethoxyethyl)-6,7,8,14-tetrahydro-6,14-endoethenonorthebaine (0.5 g.) is added to a solution of potassium hydroxide (2 g.) in ethylene glycol (10 ml.) heated to ca. 167° C. The reaction mixture is stirred at ca. 167° C. for 15 minutes, and is then cooled and diluted with water. The aqueous solution is extracted with diethyl ether, and the ether extracts are combined, washed with water and dried. The residue obtained by evaporation of the solvent is crystallized from diethyl ether to give 7α-(1,1-dimethoxyethyl)-6,7,8,14-tetrahydro-6,14-endoethenonorthebaine (213 mg.), M.P. 139–145° C.

EXAMPLE 27

Preparation of 7α-(1,1-dimethoxyethyl)-6,7,8,14-tetrahydro-6,14-endoethenonororipavine One hundred ml. of diethylene glycol containing 20.0 g. potassium hydroxide is heated to 215° C. and 5.00 g. of 7α - (1,1-dimethoxyethyl)-6,7,8,14-tetrahydro-6,14-endoethenonorthebaine is added. The temperature is maintained between 215° C. and 220° C. for 30 minutes and then allowed to cool to room temperature over about one hour. The solution is diluted with 200 ml. of water, and 100 ml. of saturated aqueous ammonium chloride is added. The solution is extracted with six 50 ml. portions of methylene chloride which are combined, extracted one time with water, dried over anhydrous sodium sulfate and evaporated to give an oil which crystallizes upon trituration with methanol; 7α-(1,1-dimethoxyethyl)-6,7, 8,14-tetrahydro-6,14-endoethenonororipavine, M.P. 260° C. decomp. is obtained.

EXAMPLE 28

Preparation of 7α-(1,1-dimethoxymethyl)-6,7,8,14-tetrahydro-6,14-endoethenothebaine Following the general procedure of Example 22, 7α-formyl-6,7,8,14 - tetrahydro-6,14-endoethenothebaine is treated with perchloric acid and trimethyl orthoformate in methanol at room temperature to give 7α-(1,1-dimethoxymethyl)-6,7,8,14-tetrahydro-6,14-endoethenothebaine.

EXAMPLE 29

Preparation of 7α-(α,α-dimethoxybenzyl)-6,7,8,14-tetrahydro-6,14-endoethenothebaine Following the general procedure of Example 22, 7α-benzoyl - 6,7,8,14-tetrahydro-6,14-endoethenothebaine is treated with perchloric acid and trimethyl orthoformate in methanol at room temperature to give 7α-(α,α-dimethoxybenzyl)-6,7,8,14-tetrahydro-6,14-endoethenothebaine.

EXAMPLE 30

Preparation of 7α-(1,1-dimethoxybutyl)-6,7,8,14-tetrahydro-6,14-endoethenothebaine Following the general procedure of Example 22, 7α-butyryl - 6,7,8,14-tetrahydro-6,14-endoethenothebaine is treated with perchloric acid and trimethyl orthoformate in methanol at room temperature to give 7α-(1,1-dimethoxybutyl)-6,7,8,14-tetrahydro-6,14-endoethenothebaine.

EXAMPLE 31

Preparation of 7α-(1,1-dimethoxyethyl)-6,7,8,14-tetrahydro-6,14-endoethanothebaine Following the general procedure of Example 22, 7α-acetyl - 6,7,8,14-tetrahydro-6,14-endoethanothebaine is treated with perchloric acid and trimethyl orthoformate in methanol at room temperature to give 7α-(1,1-dimethoxyethyl)-6,7,8,14-tetrahydro-6,14-endoethanothebaine.

EXAMPLE 32

Preparation of 7β-(1,1-dimethoxyethyl)-6,7,8,14-tetrahydro-6,14-endoethenothebaine Following the general procedure of Example 22, 7β-acetyl - 6,7,8,14-tetrahydro-6,14-endoethenothebaine is treated with perchloric acid and trimethyl orthoformate in methanol at room temperature to give 7β-(1,1-dimethoxyethyl)-6,7,8,14-tetrahydro-6,14-endoethenothebaine.

EXAMPLE 33

Preparation of 7α-(1,1-ethylenedioxyethyl)-6,7,8,14-tetrahydro-6,14-endoethenooripavine Following the general procedure of Example 24, 7α-(1,1 - ethylenedioxyethyl)-6,7,8,14-tetrahydro-6,14-endoethenothebaine is treated with potassium hydroxide in diethylene glycol at ca. 210°–220° C. Isolation of the product gives 7α-(1,1-ethylenedioxyethyl)-6,7,8,14-tetrahydro-6,14-endoethenooripavine.

EXAMPLE 34

Preparation of 7α-(1,1-dimethoxymethyl)-6,7,8,14-tetrahydro-6,14-endoethenooripavine Following the general procedure of Example 24, 7α-(1,1-dimethoxymethyl)-6,7,8,14-tetrahydro - 6,14 - endoethenothebaine is treated with potassium hydroxide in diethylene glycol at ca. 210°–220° C. to give 7α-(1,1-dimethoxymethyl) - 6,7,8,14-tetrahydro-6,14-endoethenooripavine.

EXAMPLE 35

Preparation of 7α-(α,α-dimethoxybenzyl)-6,7,8,14-tetrahydro-6,14-endoethenooripavine Following the general procedure of Example 24, 7α-(α,α-dimethoxybenzyl)-6,7,8,14-tetrahydro - 6,14 - endoethenothebaine is treated with potassium hydroxide in diethylene glycol at ca. 210°–220° C. to give 7α-(α,α-dimethoxybenzyl)-6,7,8,14-tetrahydro - 6,14 - endoethenooripavine.

EXAMPLE 36

Preparation of 7α-(1,1-dimethoxybutyl)-6,7,8,14-tetrahydro-6,14-endoethenooripavine Following the general procedure of Example 24, 7α-(1,1-dimethoxybutyl)-6,7,8,14 - tetrahydro - 6,14 - endoethenothebaine is treated with potassium hydroxide in diethylene glycol at ca. 210°–220° C. to give 7α-(1,1-dimethoxybutyl)-6,7,8,14-tetrahydro - 6,14 - endoethenooripavine.

EXAMPLE 37

Preparation of 7α-(1,1-dimethoxyethyl)-6,7,8,14-tetrahydro-6,14-endoethanooripavine Following the general procedure of Example 24, 7α-(1,1-dimethoxyethyl)-6,7,8,14 - tetrahydro - 6,14 - endoethanothebaine is treated with potassium hydroxide in diethylene glycol at ca. 210°–220° C. to give 7α-(1,1-dimethoxyethyl)-6,7,8,14-tetrahydro - 6,14 - endoethanooripavine.

EXAMPLE 38

Preparation of 7β-(1,1-dimethoxyethyl)-6,7,8,14-tetrahydro-6,14-endoethenooripavine Following the general procedure of Example 24, 7β-(1,1-dimethoxyethyl)-6,7,8,14 - tetrahydro - 6,14 - endoethenothebaine is treated with potassium hydroxide in diethylene glycol at ca. 210°–220° C. to give 7β-(1,1-dimethoxyethyl)-6,7,8,14-tetrahydro - 6,14 - endoethenooripavine.

EXAMPLE 39

Preparation of N-cyano-7α-(1,1-dimethoxybutyl)-6,7,8,14-tetrahydro-6,14-endoethenonorthebaine Following the general procedure of Example 25, 7α-(1,1-dimethoxybutyl-6,7,8,14-tetrahydro - 6,14 - endoethenothebaine is treated with cyanogen bromide in an inert solvent. Isolation of the product gives N-cyano-7α(1,1-dimethoxybutyl)-6,7,8,14-tetrahydro - 6,14 - endoethenonorthebaine.

EXAMPLE 40

Preparation of 7α-(1,1-dimethoxybutyl)-6,7,8,14-tetrahydro-6,14-endoethenonorthebaine Following the general procedure of Example 26, N-cyano-7α-(1,1-dimethoxybutyl)-6,7,8,14-tetrahydro - 6,14-endoethenonorthebaine is treated with potassium hydroxide in ethylene glycol at ca. 160°–170° C. Isolation of the product gives 7α-(1,1-dimethoxybutyl)-6,7,8,14-tetrahydro-6,14-endoethenonorthebaine.

EXAMPLE 41

Preparation of N-cyclopropylcarbonyl-7α-(1,1-dimethoxybutyl)-6,7,8,14-tetrahydro-6,14-endoethenonorthebaine Following the general procedure of Example 43, 7α-(1,1-dimethoxybutyl)-6,7,8,14-tetrahydro-6,14 - endoethenonorthebaine is treated with cyclopropylcarbonyl chloride in pyridine at room temperature. Isolation of the product gives N-cyclopropylcarbonyl-7α-(1,1-dimethoxybutyl)-6,7,8,14-tetrahydro-6,14-endoethenonorthebaine.

EXAMPLE 42

Preparation of N-cyclopropylmethyl-7α-(1,1-dimethoxybutyl)-6,7,8,14-tetrahydro-6,14-endoethenonorthebaine Following the general procedure of Example 44, N-cyclopropylcarbonyl-7α - (1,1 - dimethoxybutyl) - 6,7,8,14-tetrahydro-6,14-endoethenonorthebaine is treated with lithium aluminum hydride in anhydrous tetrahydrofuran. Isolation of the product gives N-cyclopropylmethyl-7α-(1,1-dimethoxybutyl)-6,7,8,14-tetrahydro-6,14 - endoethenonorthebaine.

EXAMPLE 43

Preparation of N-cyclopropylcarbonyl-7α-(1,1-dimethoxyethyl)-6,7,8,14-tetrahydro-6,14-endoethenonorthebaine 7α-(1,1-dimethoxyethyl)-6,7,8,14-tetrahydro - 6,14-endoethenonorthebaine (50 mg.) in pyridine (2 ml.) is added dropwise to a stirred mixture of cyclopropylcarbonyl chloride (50 mg.) and pyridine (2 ml.) at 0° C., and the resulting mixture is stirred at 0° C. for ca. 2 hours. This is then added dropwise to an aqueous sodium bicarbonate solution with stirring. The precipitate is collected and dried in methylene chloride. The residue obtained upon evaporation of solvent is collected with diethyl ether to give N-cyclopropylcarbonyl-7α-(1,1-dimethoxyethyl)-6,7,8,14-tetrahydro - 6,14 - endoethenonorthebaine (30 mg.), M.P. 164–169° C. with effervescence.

EXAMPLE 44

Preparation of N-cyclopropylmethyl-7α-(1,1-dimethoxyethyl)-6,7,8,14-tetrahydro-6,14-endoethenonorthebaine Finely powdered N - cyclopropylcarbonyl - 7α-(1,1-dimethoxyethyl)-6,7,8,14-tetrahydro-6,14 - endoethenonorthebaine (51.5 g.) is added to a stirred suspension of lithium aluminum hydride (26 g.) in diethyl ether (2 liters) and the mixture is heated under reflux for 2 hours. Water is added dropwise cautiously until the excess of lithium aluminum hydride decomposes and then the ether is decanted and dried. The residue obtained by evaporation of solvent is crystallized from methanol-n-hexane to give N-cyclopropylmethyl-7α-(1,1-dimethoxyethyl)-6,7,8, 14 - tetrahydro - 6,14 - endoethenonorthebaine (41.86 g., 83.5%), M.P. 130–132° C.

EXAMPLE 45

Preparation of N-cyclopropylmethyl-7α-(1,1-dimethoxyethyl)-6,7,8,14-tetrahydro-6,14-endoethenonororipavine Following the general procedure of Example 24, N-cyclopropylmethyl-7α-(1,1 - dimethoxyethyl) - 6,7,8,14-tetrahydro-6,14-endoethenonorthebaine (2 g., 4.3 mmole) is added to a stirred solution of potassium hydroxide (8 g.) in diethylene glycol (40 ml.) at ca. 220° C. After 30 minutes at this temperature the mixture is cooled and diluted with water. The solution is adjusted to pH 8 with saturated aqueous ammonium chloride added dropwise with vigorous stirring. The precipitate which forms is filtered off and dried via methylene chloride solution. The oil obtained by evaporation of the solvent is treated with charcoal in diethyl ether solution. Evaporation of solvent gives an oil which crystallizes from methanol to give N-cyclopropylmethyl-7α - (1,1-dimethoxyethyl)-6,7,8,14-tetrahydro - 6,14 - endoethenonororipavine methanolate, M.P. 97–990° C. with effervescence.

EXAMPLE 46

Preparation of N-cyclobutylcarbonyl-7α-(1,1-dimethoxyethyl)-6,7,8,14-tetrahydro-6,14-endoethenonorthebaine Cyclobutylcarbonyl chloride (10 g.) is added to methylene chloride (200 ml.) containing anhydrous potassium carbonate (10 g.) and stirred at room temperature for 15 minutes. The ketal 7α-(1,1-dimethoxyethyl)-6,7,8,14-tetrahydro-6,14-endoethenonorthebaine (20 g.) in methylene chloride (200 ml.) is added in a rapid stream, and the mixture stirred for one hour. After washing with excess aqueous sodium bicarbonate soluttion and then with water the organic solution is dried over sodium sulfate and evaporated to give an oil (a band in the infrared at about 6.7μ indicates the presence of ketone from hydrolized ketal). The oil is then dissolved in methanol (200 ml.), 72% perchloric acid (10 ml.) is added followed by trimethylorthoformate (100 ml.). After stirring at room temperature for five minutes, pyridine (20 ml.) is added and the entire mixture poured into aqueous sodium bicarbonate solution (300 ml.). The mixture is extracted six times with 50 ml. portions of methylene chloride; the organic phases are combined, extracted with water, dried over sodium sulfate and evaporated. Crystalline N-cyclobutylcarbonyl-7α-(1,1 - dimethoxyethyl)-6,7,-8,14-tetrahydro-6,14-endoethenonorthebaine is obtained in 5 successive crops by crystallization from methanol/hexane (total yield 17.15 g.; 71.5%), M.P. 184–185° C.

EXAMPLE 47

Preparation of N-cyclobutylmethyl-7α-(1,1-dimethoxyethyl)-6,7,8,14-tetrahydro-6,14-endoethenonorthebaine N-cyclobutylcarbonyl-7α-(1,1 - dimethoxyethyl)-6,7,8,-14-tetrahydro - 6,14 - endoethenonorthebaine (16.4 g.) is mixed with 200 ml. of diethyl ether and added to a stirred suspension of lithium aluminum hydride (7 g.) in 400 ml. of diethyl ether, and the mixture is heated under reflux for 2.5 hours. Water is cautiously added dropwise until the excess lithium aluminum hydride is decomposed. The ether layer is decanted, dried, and evaporated to a non-crystalline residue. N - cyclobutylmethyl-7α-(1,1-dimethoxyethyl)-6,7,8,14-tetrahydro - 6,14 - endoethenonorthebaine is thereby obtained as a glass; infrared, no carbonyl band; nuclear magnetic resonance δ3.22 ($C_{19}$-dimethoxy) and 2.50 (N—$CH_2$—$C_4H_7$).

EXAMPLE 48

Preparation of N-cyclobutylmethyl-7α-(1,1-dimethoxyethyl)-6,7,8,14-tetrahydro-6,14-endoethenonororipavine Following the general procedure of Example 24, N-cyclobutylmethyl - 7α - (1,1 - dimethoxyethyl)-6,7,8,14-tetrahydro-6,14-endoethenonorthebaine is treated with potassium hydroxide in diethyleneglycol at ca. 210°–220° C. to give N-cyclobutylmethyl-7α-(1,1-dimethoxyethyl)-6,7,8,14-tetrahydro-6,14-endoethenonororipavine.

EXAMPLE 49

Preparation of N-cyclopropylcarbonyl-7α-(1,1-dimethoxyethyl)-6,7,8,14-tetrahydro-6,14-endoethanonorthebaine 7α-(1,1-dimethoxyethyl)-6,7,8,14 - tetrahydro-6,14-endoethanonorthebaine in pyridine is added dropwise to a stirred mixture of cyclopropylcarbonyl chloride and pyridine at 0° C., and the resulting mixture is stirred at 0° C. for ca. 2 hours. This is then added dropwise to an aqueous sodium bicarbonate solution with stirring. The precipitate is collected and dried in methylene chloride. The residue obtained upon evaporation of solvent is collected with diethyl ether to give N-cyclopropylcarbonyl-7α-(1,1-dimethoxyethyl)-6,7,8,14-tetrahydro - 6,14 - endoethanonorthebaine.

EXAMPLE 50

Preparation of N - cyclopropylmethyl-7α-(1,1-dimethoxyethyl)-6,7,8,14-tetrahydro-6,14-endoethanonorthebaine Lithium aluminum hydride is added to a solution of N-cyclopropylcarbonyl-7α - (1,1-dimethoxyethyl)-6,7,8,-14-tetrahydro-6,14-endoethanonorthebaine in anhydrous tetrahydrofuran, and the mixture is heated under reflux for ca. 1 hour. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7α-(1,1 - dimethoxyethyl) - 6,7,8,14 - tetrahydro-6,14-endoethanonorthebaine.

EXAMPLE 51

Preparation of N-cyclopropylmethyl-7α-(1,1-dimethoxyethyl)-6,7,8,14-tetrahydro-6,14-endoethanonororipavine Following the general procedure of Example 24, N-cyclopropylmethyl-7α-(1,1 - dimethoxyethyl) - 6,7,8,14-tetrahydro - 6,14 - endoethanonorthebaine is treated with potassium hydroxide in diethyleneglycol at ca. 210°–220° C. to give N-cyclopropylmethyl-7α-(1,1-dimethoxyethyl)-6,7,8,14-tetrahydro-6,14-endoethanonororipavine.

EXAMPLE 52

Preparation of 7α - (1,1-dimethoxyethyl)-N-(3-methyl-2-buten-1-yl) - 6,7,8,14 - tetrahydro-6,14-endoethanonorthebaine By reacting 7α-(1,1-dimethoxyethyl)-6,7,8,14-tetrahydro-6,14-endoethanonorthebaine with 3-methyl-2-buten-1-yl bromide in an inert solvent, 7α-(1,1-dimethoxyethyl)-N-(3-methyl-2-buten-1-yl) - 6,7,8,14 - tetrahydro-6,14-endoethanonorthebaine is thereby obtained.

EXAMPLE 53

Preparation of 7α(1,1 - dimethoxyethyl)-N-(3-methyl-2-buten - 1 - yl) - 6,7,8,14 - tetrahydro-6,14-endoethanonororipavine Following the general procedure of Example 24, 7α-(1,1-dimethoxyethyl)-N-(3 - methyl-2-buten-1-yl)-6,7,8,-14-tetrahydro-6,14-endoethanonorthebaine is treated with potassium hydroxide in diethyleneglycol at ca. 210°–220° C. to give 7α-(1,1-dimethoxyethyl)-N-(3-methyl-2-buten-1-yl)-6,7,8,14-tetrahydro-6,14-endoethanonororipavine.

EXAMPLE 54

Preparation of 7α-(1,1-dimethoxyethyl)-6,7,8,14-tetrahydro-6,14-endoethanonorthebaine N - cyano - 7α-(1,1-dimethoxyethyl)-6,7,8,14-tetrahydro-6,14-endoethanonorthebaine is added to a solution of potassium hydroxide in ethylene glycol heated at ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is crystallized to give 7α-(1,1-dimethoxyethyl)-6,7,8,14-tetrahydro-6,14-endoethanonorthebaine.

EXAMPLE 55

Preparation of N-cyano-7α-(1,1-dimethoxyethyl)-6,7,8,14-tetrahydro-6,14-endoethanonorthebaine A solution of cyanogen bromide in chloroform is dried over sodium sulfate for a few minutes, and is then filtered onto 7α - (1,1 - dimethoxyethyl-6,7,8,14-tetrahydro-6,14-endoethanonorthebaine, chloroform being used for washing. The mixture is heated under reflux for about 24 hours. The cooled mixture is washed with an aqueous sodium bicarbonate solution, washed with water, and dried. The residue obtained by evaporation of the solvent is crystallized to give N-cyano-7α-(1,1-dimethoxyethyl)-6,7,8,14-tetrahydro-6,14-endoethanonorthebaine.

EXAMPLE 56

Preparation of 7α-(1,1-dimethoxy-4-methylpentyl)-6,7,8,14-tetrahydro-6,14-endoethenothebaine Followin the general procedure of Example 22, 7α-(4-methylpentanoyl) - 6,7,8,14 - tetrahydro-6,14-endoethenothebaine is treated with perchloric acid and trimethyl orthoformate in methanol at room temperature to give 7α - (1,1 - dimethoxy-4-methylpentyl)-6,7,8,14-tetrahydro-6,14-endoethenothebaine.

EXAMPLE 57

Preparation of N-cyano-7β-(1,1-dimethoxyethyl)-6,7,8,14-tetrahydro-6,14-endoethenonorthebaine A solution of cyanogen bromide in chloroform is filtered onto 7β - (1,1 - dimethoxyethyl)-6,7,8,14-tetrahydro-6,14-endoethenothebaine, chloroform being used for washing. The mixture is heated under reflux for 26 hours. The cooled mixture is washed with an aqueous sodium bicarbonate solution, washed with water, and dried. The residue obtained by evaporation of the solvent is N-cyano-7β-(1,1 - dimethoxyethyl) - 6,7,8,14-tetrahydro-6,14-endoethenonorthebaine.

EXAMPLE 58

Preparation of 7β-(1,1-dimethoxyethyl)-6,7,8,14-tetrahydro-6,14-endoethenonorthebaine N - cyano - 7β - (1,1-dimethoxyethyl)-6,7,8,14-tetrahydro-6,14-endoethenonorthebaine is added to a solution of potassium hydroxide in ethylene glycol heated to ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is 7β-(1,1 -dimethoxyethyl) - 6,7,8,14 - tetrahydro-6,14-endoethenonorthebaine.

EXAMPLE 59

Preparation of N-cyclopropylmethyl-7β-(1,1-dimethoxyethyl)-6,7,8,14-tetrahydro-6,14-endoethenonorthebaine 7β - (1,1 - dimethoxyethyl) - 6,7,8,14-tetrahydro-6,14-endoethenonorthebaine in pyridine is added dropwise to a stirred mixture of cyclopropylcarbonyl chloride and pyridine at 0° C., and the resulting mixture is stirred at 0° C. This is then added dropwise to an aqueous sodium bicarbonate solution with stirring. The precipitate is collected and dried in methylene chloride. The residue obtained upon evaporation of solvent is collected to give N-cyclopropylcarbonyl - 7β - (1,1-dimethoxyethyl)-6,7,8,14-tetrahydro - 6,14 - endoethenonorthebaine. Lithium aluminum hydride is added to a solution of N-cyclopropylcarbonyl - 7β - (1,1-dimethoxyethyl)-6,7,8,14-tetrahydro-6,14-endoethenonorthebaine in anhydrous tetrahydrofuran, and the mixture is heated under reflux. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7β-(1,1-dimethoxyethyl)-6,7,8,14-tetrahydro-6,14-endoethenonorthebaine.

EXAMPLE 60

Preparation of N-cyclopropylmethyl-7β-(1,1-dimethoxyethyl)-6,7,8,14-tetrahydro-6,14-endoethenonororipavine Following the general procedure of Example 24, N-cyclopropylmethyl - 7β-(1,1-dimethoxyethyl)-6,7,8,14-tetrahydro-6,14-endoethenonorthebaine is treated with potassium hydroxide in diethyleneglycol at ca. 210°–220° C. to give N - cyclopropylmethyl - 7β - (1,1-dimethoxyethyl)-6,7,8,14-tetrahydro-6,14-endoethenonororipavine.

EXAMPLE 61

Preparation of 7α-(1,1-dimethoxy-4-methylpentyl)-6,7,8,14-tetrahydro-6,14-endoethenooripavine Following the general procedure of Example 24, 7α-(1,1 - dimethoxy - 4 - methylpentyl)-6,7,8,14-tetrahydro-6,14-endoethenothebaine is treated with potassium hydroxide in diethylene glycol at ca. 210°–220° C. to give 7α-(1,1 - dimethoxy - 4 - methylpentyl)-6,7,8,14-tetrahydro-6,14-endoethenooripavine.

We claim:
1. A compound selected from the group consisting of those of the formula:

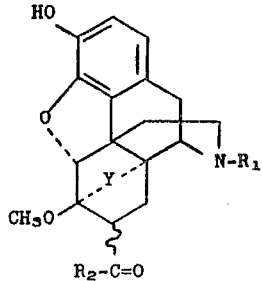

wherein $R_1$ is selected from the group consisting of hydrogen, methyl, lower alkenyl and lower cycloalkylmethyl; $R_2$ is selected from the group consisting of hydrogen, phenyl and alkyl of from 1 to 5 carbon atoms; and Y is selected from the group consisting of etheno and ethano; the non-toxic pharmaceutically acceptable acid-addition salts thereof; and the alkali metal phenolates thereof.

2. A compound according to claim 1 wherein $R_1$ and $R_2$ are methyl; Y is ethano and the configuration at the 7-position is alpha.

3. A compound according to claim 1 wherein $R_1$ is cyclopropylmethyl; $R_2$ is methyl; Y is etheno and the configuration at the 7-position is alpha.

4. A compound according to claim 1 wherein $R_1$ is cyclopropylmethyl; $R_2$ is methyl; Y ethano and the configuration at the 7-position is alpha.

5. A compound according to claim 1 wherein $R_1$ is allyl; $R_2$ is methyl; Y is etheno and the configuration at the 7-position is alpha.

6. A compound according to claim 1 wherein $R_1$ and $R_2$ are methyl; Y is ethano and the configuration at the 7-position is alpha.

7. A compound according to claim 1 wherein $R_1$ and $R_2$ are methyl; Y is etheno and the configuration at the 7-position is beta.

8. A compound selected from the group consisting of those of the formula:

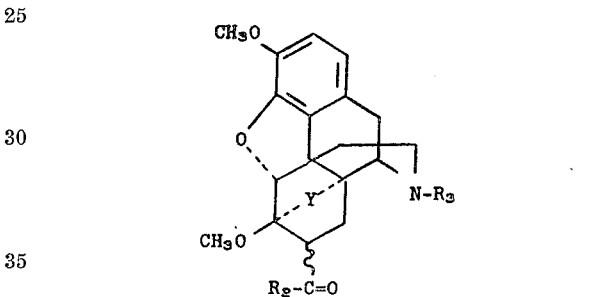

wherein $R_2$ is selected from the group consisting of hydrogen, phenyl and alkyl of from 1 to 5 carbon atoms; $R_3$ is lower cycloalkylmethyl; and Y is selected from the group consisting of etheno and ethano; and the non-toxic pharmaceutically acceptable acid-addition salts thereof.

9. A compound according to claim 8 wherein $R_2$ is methyl; $R_3$ is cyclopropylmethyl; Y is etheno and the configuration at the 7-position is alpha.

10. A compound according to claim 8 wherein $R_2$ is methyl; $R_3$ is cyclopropylmethyl; Y is ethano and the configuration at the 7-position is alpha.

References Cited

UNITED STATES PATENTS

| | | | |
|---|---|---|---|
| 3,433,791 | 3/1969 | Bentley | 260—285 |
| 3,442,900 | 5/1969 | Bentley | 260—285 |
| 3,464,992 | 9/1969 | Mayor | 260—285 |
| 3,474,101 | 10/1969 | Bentley | 260—285 |

FOREIGN PATENTS

| | | | |
|---|---|---|---|
| 969,263 | 8/1964 | Great Britain | 260—285 |

DONALD G. DAUS, Primary Examiner

U.S. Cl. X.R.

424—260